Figure 1:
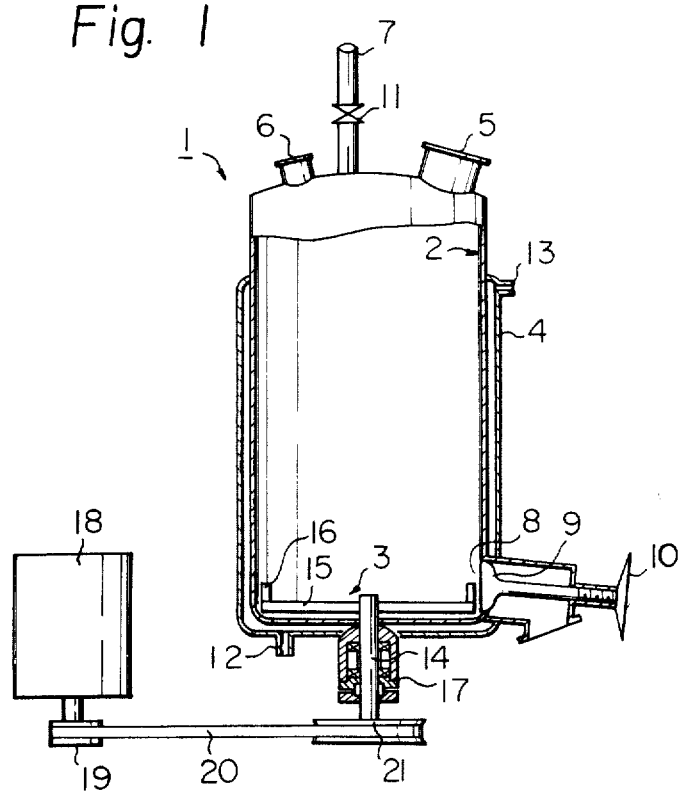

United States Patent [19]
Kawaguchi et al.

[11] 3,943,115
[45] Mar. 9, 1976

[54] METHOD FOR PREPARING FINELY DIVIDED ETHYLENE POLYMER PARTICLES

[75] Inventors: Minoru Kawaguchi, Yokohama; Yasuki Yamasaki, Chiba; Hideo Shimizu, Ichihara; Shinichi Taoka, Ichihara; Yoshio Hayamizu, Ichihara, all of Japan

[73] Assignee: Ube Industries, Ltd., Ube, Japan

[22] Filed: Mar. 18, 1975

[21] Appl. No.: 559,440

[30] Foreign Application Priority Data
Mar. 23, 1974 Japan.............................. 49-32253
July 5, 1974 Japan.............................. 49-76440

[52] U.S. Cl. ... 260/87.3; 260/94.9 F; 260/94.9 GD; 260/897 A; 260/897 B
[51] Int. Cl.² .......................................... C08F 6/12
[58] Field of Search............... 450/770, 773, 773.5; 260/87.3, 94.9 F, 94.9 GD, 897 A, 897 B

[56] References Cited
UNITED STATES PATENTS

| | | | |
|---|---|---|---|
| 2,945,020 | 7/1960 | Hall | 260/94.9 |
| 2,977,351 | 3/1961 | Wiley | 260/94.9 |
| 3,244,687 | 4/1966 | Spindler | 260/94.9 |

*Primary Examiner*—Stanford M. Levin

[57] ABSTRACT

Finely divided ethylene polymer particles having a smooth surface and regular spherical configuration are prepared by a method in which an ethylene polymer, an organic solvent for the polymer and water are charged into a vessel, the charge is stirred to mix the organic solvent, water and ethylene polymer, the charge is heated to a temperature at which the ethylene polymer is completely dissolved in the organic solvent, so as to form an organic solvent solution of the ethylene polymer mixed with water, the charge is cooled and, then, the mixture of organic solvent and water is evaporated away from the charge so as to allow the ethylene polymer to deposit in the form of finely divided particles from the charge.

17 Claims, 2 Drawing Figures

METHOD FOR PREPARING FINELY DIVIDED ETHYLENE POLYMER PARTICLES

The present invention relates to a method for preparing finely divided ethylene polymer particles, more particularly, relates to a method for preparing finely divided ethylene polymer particles useful for fluidized bed coating, electrostatic painting and sol coating processes, within a short time with a high yield.

In present practice, the following two methods are resorted to for the preparation of finely divided ethylene polymer particles.

a. The method of mechanically grinding the ethylene polymer.

b. The method of depositing ethylene polymer particles from their solution in an organic solvent by cooling the solution and recovering the solvent from the solution.

The type of powdered ethylene polymer particles prepared by the mechanical grinding method have a very poor fluidity due to irregularity of the particle surfaces. Accordingly, a type of the method of depositing the ethylene polymer particles from their solution is generally utilized for the preparation of the finely divided ethylene polymer particles usable for the fluidized bed coating, electrostatic painting and sol coating processes.

It is conventional to produce the finely divided ethylene polymer particles by a method wherein an amount of ethylene polymer is dissolved in an organic solvent contained in a vessel at an elevated temperature, water is poured into the solution while the solution is agitated as slowly as possible, and after the start of the agitating operation, a mixture of the organic solvent and water is recovered from the solution and the ethylene polymer is allowed to deposit in the form of finely divided particles from the solution. However, the above conventional method has disadvantages in that a long time of about 8 hours is required from the start of the dissolving operation to the end of the discharging operation for the product, that the pouring of water frequently causes undesirable bumping of the solution and the bumping results in formation of large size or irregular configuration ethylene polymer particles or lumps, that it is necessary that the operations be carried out very carefully while closely watching the behaviour of the solution in the vessel and that the yield of fine particles is low.

The principal object of the present invention is to provide a method for preparing finely divided ethylene polymer particles having a high fluidity with a high yield.

Another object of the present invention is to provide a method for preparing finely divided ethylene polymer particles having smooth surfaces within a short time.

The other object of the present invention is to provide a method for preparing finely divided ethylene polymer particles having a high uniformity in size without operational difficulty.

The above objects can be accomplished by the method of the present invention which comprises the steps of:

1. charging a closed vessel having a stirrer with 1 part by weight of an ethylene polymer selected from the group consisting of polyethylene, copolymers of ethylene and vinyl acetate and mixtures of two or more of the above-mentioned polymers, 1.2 to 5.0 parts by weight of an organic solvent capable of dissolving said ethylene polymer and water in an amount of 1 to 4 times that necessary for producing an azeotropic mixture with said amount of said organic solvent charged;

2. stirring said charge to mix the ethylene polymer, organic solvent and water, and;

3. effecting, while stirring said mixture, the following operations:

a. heating said mixture to a temperature not lower than the dissolving point beneath which said ethylene polymer can not be completely dissolved in said amount of said organic solvent, while allowing said ethylene polymer to be dissolved in said organic solvent;

b. cooling said mixture to a temperature of at least 25°C beneath said dissolving point of said ethylene polymer in said organic solvent but not lower than 0°C, and;

c. evaporating away said organic solvent and water from said mixture under a reduced pressure condition, while said ethylene polymer is allowed to deposit in the form of finely divided, smoothly surfaced spherical particles from the mixture of said organic solvent and water.

According to the method of the present invention, the preparation of finely divided ethylene polymer particles can be completed in a short time of about of 3 hours or less from the start of the dissolving operation for the ethylene polymer to the end of the discharging operation for the product. All of the operations can be carried out without operational difficulty derived from, for example, the bumping of the solution, because water is mixed with the organic solution before the start of the dissolving operation but not in the course of the dissolving operation. Further, it should be noted that the method of the present invention can produce finely divided ethylene particles which are capable of passing through a 42 mesh size screen (by Tyler Standard Sieve System) in a large yield. Furthermore, it is important that the finely divided ethylene polymer particles produced by the method of the present invention have very smooth surfaces and a regular spherical configuration and these properties result in an excellent fluidity of the particles.

The mesh size used herein is determined in accordance with Tyler Standard Sieve System.

Figure 2:
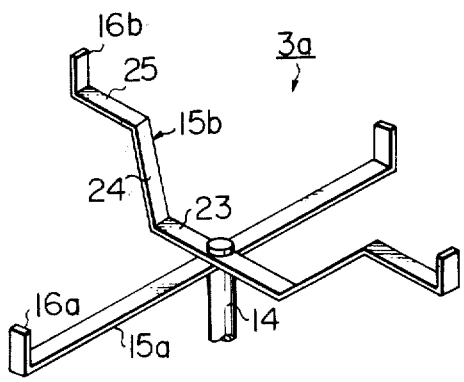

The features of the method of the present invention are exemplified and more fully explained in the following description, wherein reference is made to the accompanying drawings in which:

FIG. 1 shows a cross-sectional view of an embodiment of an apparatus usable for carrying out the method of the present invention, and, FIG. 2 shows a schematic view of a type of stirrer usable for the present invention.

The ethylene polymer usable for the method of the present invention can be selected from the group consisting of polyethylenes, copolymers of ethylene and vinyl acetate and mixtures of two or more of above-mentioned polymers. The polyethylene may be any of the polyethylenes having a melt flow index of 0.1 to 60 and produced by conventional high pressure, medium pressure and low pressure polymerization processes. The ethylenevinyl acetate copolymer consists preferably of at most 50% by weight, more preferably, at most 30% by weight, copolymerized vinyl acetate and the balance of copolymerized ethylene.

The organic solvent usable for dissolving the ethylene polymer therein in accordance with the method of the present invention may be from the group consisting of aliphatic hydrocarbons, cycloaliphatic hydrocarbons, aromatic hydrocarbons and halogenated aliphatic hydrocarbons, each having a boiling point between 50° and 150°C, preferably 80° and 120°C, and mixtures of two or more of the above-mentioned compounds. The aliphatic hydrocarbon may be selected from the group consisting of n-hexane, n-heptane and n-octane. The cycloaliphatic hydrocarbon may be either cyclohexane or cycloheptane. The aromatic hydrocarbon may be selected from the group consisting of benzene, toluenes, xylenes and ethyl benzene. The halogenated aliphatic hydrocarbon may be selected from the group consisting of tetrachloromethane, chloroform, trichloroethylene and tetrachloroethylene. In consideration of operational safety, the incombustible halogenated aliphatic hydrocarbons are most beneficial for the method of the present invention.

The organic solvent is mixed in an amount of 1.2 to 5.0 parts by weight, preferably, 1.5 to 2.5 parts by weight with 1 part by weight of the ethylene polymer to be processed by the method of the present invention. The mixing of the organic solvent in an amount less than 1.2 parts by weight with respect to 1 part by weight of the ethylene polymer results in a difficulty in complete dissolving of the ethylene polymer and a decrease in yield of the finely divided ethylene polymer particles. If the organic solvent is mixed in an amount larger than 50 parts by weight with 1 part by weight of the ethylene polymer, a long time evaporating operation is undesirably required to complete the recovery of the organic solvent.

Water to be mixed with the organic solvent in accordance with the method of the present invention is used in an amount of 1 to 4 times, more preferably, 1.5 to 3.5 times, that necessary for producing an azeotropic mixture with the amount of the organic solvent. For instance, an azeotropic mixture of trichloroethylene and water consists of 100 parts by weight trichloroethylene and 6.9 parts by weight of water. Accordingly, if 10 kg of trichloroethylene is employed as the organic solvent for the ethylene polymer, the water to be mixed with the amount of the trichloroethylene is in an amount between 0.69 and 2.76 kg, preferably, 1.04 and 2.41 kg.

Table 1 demonstrates compositions of various azeotropic mixtures each consisting of water and a type of organic solvent. Table 1 also demonstrates the amount of water to be mixed with 10 kg of the organic solvent as shown in the table.

Table 1

| Item<br>Organic solvent | Composition of azeotropic mixture | | Amount of water to be mixed with 10Kg of organic solvent (Kg) |
|---|---|---|---|
| | Organic solvent (part by weight) | Water (part by weight) | |
| Trichloroethylene | 100 | 6.9 | 0.69 – 2.76 |
| Tetrachloromethane | 100 | 4.3 | 0.42 – 1.72 |
| Tetrachloroethylene | 100 | 20.2 | 2.02 – 8.08 |
| Benzene | 100 | 9.7 | 0.97 – 3.88 |
| n-hexane | 100 | 3.7 | 0.37 – 1.48 |
| Toluene | 100 | 23.9 | 2.39 – 9.56 |

If the water is used in an amount outside of the above-specified range, a decrease in yield of the finely divided ethylene polymer particles which are capable of passing through a 42 mesh size screen results.

In the method of the present invention, the ethylene polymer, the organic solvent and water are charged into a closed vessel having a stirrer. After the complete charging, the charge is stirred by the stirrer so as to mix the ethylene polymer, organic solvent and water. In the stirring operation, it is preferable that the stirrer is provided with a rotary shaft and at least two stirring paddles extending from the rotary shaft and approaching the inside wall surface of the vessel and the stirrer is rotated at a peripheral velocity of the stirring paddles of 4 to 16 m/second, more preferably, 5 to 14 m/second. The term "peripheral velocity" used herein refers to the velocity of the outermost end of each stirring paddle.

If the stirring paddles are rotated at a peripheral velocity lower than 4 m/second, a long time is required to complete the dissolving operation for the ethylene polymer, and the product includes therein small size ethylene polymer particles in an decreased amount. If the peripheral velocity of the stirring paddles is larger than 16 m/second, a large amount of heat is generated due to rapid shearing of the mixture with the stirring paddles during the evaporating operation period. This results in difficulty in cooling the mixture.

After the start of the stirring operation, the mixture is heated to a temperature not lower than the dissolving point of the ethylene polymer so as to allow the ethylene polymer to be dissolved in the organic solvent. The term "dissolving point" used herein refers to a temperature beneath which the amount of the ethylene polymer can not be completely dissolved in the amount of the organic solvent. The dissolving point is determined in response to the types and amounts of the organic solvent and the ethylene polymer used for the preparation process, by the following method. In the method, predetermined amounts and types of ethylene polymer pellets and an organic solvent are charged into a closed glass vessel resistant to pressure. The charge is heated at a temperature-elevating rate of 1° C/5 minutes until the charge becomes clear due to complete dissolving of the polymer in the solvent. The charge is cooled to an ambient temperature while allowing the polymer to deposit from the solution. Thereafter, the charge is heated again at the temperature-elevating rate of 1°C/5 minutes until the charge becomes clear. The temperature at which the charge becomes clear is measured. This temperature is referred to as a dissolving point of the ethylene polymer under the predetermined circumstances.

Generally, the dissolving point of the ethylene polymer is in a range from 50° to 120°C. Accordingly, the dissolving of the ethylene polymer is preferably effected at a temperature higher than 50°C, more preferably, higher than 70°C, still more preferably, between 70° and 90°C.

By the above-mentioned heating operation, the ethylene polymer is completely dissolved in the organic solvent mixed with water.

After the formation of the ethylene polymer solution is completed, the charge is cooled to a temperature of at least 25°C, preferably, at least 30°C, beneath the dissolving point of the ethylene polymer in the organic solvent but not lower than 0°C while stirring the charge. If the cooling temperature is higher than 25°C beneath the dissolving point, the product includes therein large size ethylene polymer particles or lumps in a large amount. This results in a low yield of small size ethylene polymer particles. Generally, the lower the cooling temperature, the larger the yield of ethylene polymer particles capable of passing through a 42 mesh size screen, especially, a 150 mesh size screen which are suitable for the electrostatic and sol painting processes. The cooling temperature below 0°C produces a disadvantage in that a long time is required to complete the recovery of the organic solvent from the charge under a reduced pressure.

When the charge reaches the desired cooling temperature, the organic solvent and water are evaporated away from the charge under a reduced pressure while stirring the mixture. Preferably, the evaporating rate is in a range between 0.3 and 2.5 liters/hour, more preferably, 0.5 and 2.0 liters/hour, of the mixture of the organic solvent and water per 1 kg of the ethylene polymer.

If the evaporating operation is carried out at a rate lower than 0.3 liters/hour, a long time is required to complete the evaporating operation. An evaporating rate higher than 2.5 liters/hour results in the formation of large size ethylene polymer particles or lumps and in a decrease in the yield of ethylene polymer particles capable of passing through a 42 mesh size screen. The evaporating rate can be adjusted by setting the reduced pressure to be applied to the inside of the vessel. In other words, the reduced pressure can be set forth in response to the desired evaporating rate. Preferably, the reduced pressure is in a range between 200 and 700 mmHg.

The method of the present invention can be effected by any of the conventional apparatus which are provided with a closed vessel for receiving a charge consisting of the mixture of the ethylene polymer, organic solvent and water, a device for stirring the charge at a predetermined rotating velocity and a device for heating the charge to a predetermined temperature. The apparatus may be of a Henschel type as indicated in the accompanying drawing. Referring to the drawing, an apparatus 1 is provided with a closed vessel 2, a stirrer 3 and a jacket 4. The closed vessel 2 is provided with an inlet 5 through which the charge is fed into the vessel 2, an observing window 6 through which the inside of the vessel is observed, a pipe 7 which is connected to the vessel 2 at a top portion thereof and through which the organic solvent and water are evaporated away, and an outlet 8 through which the product is discharged. The outlet 8 is opened and closed by means of a stopper 9 which is movable by turning a handle 10. The pipe 7 is opened and closed by means of a valve 11 and connected to a device (not indicated in the drawing) for producing a reduced pressure.

The jacket 4 is disposed outside of the vessel 2 and provided with an inlet 12 for feeding a heating medium, for example, hot water, or cooling medium, for instance, cooling water, and an outlet 13 for discharging the heating or cooling medium. The heating medium or cooling medium may be recycled through a heatexchanger (not shown in the drawing) by which the medium is adjusted to a desired temperature.

The stirrer 3 is provided with a rotary shaft 14 extending through a bottom of the vessel 2. A pair of stirring paddles 15 extend from the shaft 14 and approach the inside wall surface of the vessel 2. A pair of supplementary stirring blades 16 extend upwards from the ends of the stirring paddles 15 along the inside wall surface of the vessel 2. The shaft 14 is supported by a bearing 17 and connected to a motor 18 through a pulley 19, a belt 20 and a pulley 21.

The stirrer usable for the present invention may be provided with three paddles or more, for example, two pairs of paddles. Referring to FIG. 2, a stirrer 3a has two pairs of paddles, 15a and 15b. The paddles 15a are of the same type as the paddles 15 in FIG. 1 and are provided with the same type of supplementary stirring blades 16a as the blades 16 in FIG. 1. The paddles 15b are each provided with a first arm 23 horizontally extending from the rotary shaft 14, a second arm 24 extending upwards from the first arm 23, a third arm 25 horizontally extending from the second arm 24 and a supplementary stirring blade 16b extending upwards from the third arm 25 along the inside wall surface of the vessel (not shown in FIG. 2). This type of the stirrer is effective for uniformly mixing the charge.

The following is a preferable embodiment of the preparation of the finely divided ethylene polymer particles in accordance with the method of the present invention using the type of apparatus as demonstrated in FIG. 1. Referring to FIG. 1, before the start of the process, the outlet 8 and valve 11 are closed. Predetermined amounts of the ethylene polymer, the organic solvent and water are charged into the vessel through the inlet 5 and mixed with each other. In the charging operation, it is preferable that the mixture received in the vessel forms a layer having a depth identical to or smaller than one-third the inside depth of the vessel 2.

After completion of the charging operation, the inlet 5 is closed, and the stirrer 3 is rotated at a preset peripheral velocity by actuating the motor 18. The stirring operation results in mixing the organic solvent, ethylene polymer and water.

After the start of the stirring operation, a heating medium, for instance, hot water, which has been adjusted to a predetermined temperature, is circulated through the inlet 12, the jacket 4 and the outlet 13. When the mixture reaches the dissolving point or higher, the ethylene polymer is completely dissolved in the organic solvent particles. Accordingly, the solution of the ethylene polymer in the organic solvent is uniformly mixed with water.

In the other procedures, the ethylene polymer is fed into the vessel after the organic solvent is mixed in water by the stirring operation and, thereafter, the mixture of the organic solvent, water and ethylene polymer is subjected to the heating operation. After the heating operation is completed, the heating medium is withdrawn from the jacket 4 and a cooling medium, for instance, cold water, is circulated through the inlet 12, the jacket 4 and the outlet 13, to cool the charge to a predetermined temperature which is lower than the dissolving point by at least 25°C but not lower than 0°C.

While the mixture is maintained at the cooling temperature, the valve 11 of the pipe 7 is opened so that the inside of the vessel 2 is connected to the device (not shown in the drawing) for generating a reduced pressure. Under the reduced pressure, the organic solvent and water are evaporated away from the vessel 2 through the pipe 7. As a result of the evaporating operation, the ethylene polymer is permitted to deposit in the form of finely divided smoothly surfaced spherical particles from the mixture of the organic solvent and water. By adjusting the reduced pressure to a predetermined value, the mixture of the organic solvent and water is evaporated way at a desired evaporating rate.

After completion of the evaporating operation, the stopper 9 is released from the outlet 8 by turning the handle 10 in order to discharge the product from the vessel through the outlet 8.

Throughout the heating, cooling and evaporating operations, the stirrer is actuated at the preset velocity.

Needless to say, the apparatus usable for the method of the present invention is not limited to the one indicated in the drawings, that is, the Henschel type apparatus. A type of apparatus in which a stirrer is provided with a shaft extending through a top lid of the vessel into inside of the vessel and has two or more stirring paddles connected to the shaft, is also usable for the method of the present invention.

In any type of apparatus, it is preferable that the inside depth of the vessel be about 1 to 3 times the inside diameter of the vessel. It is also preferable that the stirring paddles, measured from the longitudinal axis of the rotary shaft to an outer end of the paddle, have a length of eight tenths of the inside radius of the vessel or more, more preferably, nine tenths or more, but do not touch the inside wall surface of the vessel.

The stirring paddle may be provided with a supplementary stirring blade extending from the outer end thereof along the inside wall surface of the vessel. This supplementary stirring blade is effective for preventing formation of the ethylene polymer particle layer on the inside wall surface of the vessel by scraping off the particles adhered to the inside wall surface. That is, the supplementary stirring blade is effective for maintaining the heating and cooling effects at a desired level throughout the heating, cooling and evaporating operation periods.

According to the method of the present invention, finely divided smoothly surfaced ethylene polymer particles smaller than 42 mesh size can be produced in a large yield. Ethylene polymer particles capable of passing through a 42 mesh size screen and being retained on a 150 mesh size screen are suitable for the fluidized bed coating process. Very fine ethylene polymer particles capable of passing through a 150 mesh size screen are mainly utilized for the electrostatic painting and sol painting processes.

The present invention will be further illustrated by the following examples which are given by way of illustration and not as limitations to the scope of the present invention.

EXAMPLES 1 through 4 and comparison

EXAMPLES 1 and 2

In each of the Examples 1 through 4, a type of closed vessel as illustrated in the accompanying drawing, having an inside diameter of 40 cm and an inside depth of 80 cm and being provided with a stirrer with a pair of stirring paddles 19.25 cm long and a jacket for flowing therethrough a heating and cooling media, was used. The closed vessel was charged with 6 kg of polyethylene having a melt flow index of 10 and a density of 0.919 g/cm3 in the form of numerous pellets, 12 kg of trichloroethylene and water in the amount indicated in Table 2. The dissolving point of the polyethylene in the trichloroethylene in the amount mentioned above was 90°C. The charge in the vessel was agitated by rotating the stirrer paddles at a peripheral velocity of 8 m/second and heated to above the dissolving temperature by flowing hot water through the jacket. 30 minutes after the start of the heating, the polyethylene pellets were completely dissolved in trichloroethylene. Thereafter, the charge in the vessel was immediately cooled to a temperature of 40°C by flowing cooling water through the jacket so as to allow the polyethylene to deposit from the trichloroethylene. The vessel was reduced to a pressure of 200 to 700 mmHg while maintaining the charge in the vessel at a temperature of 40°C, in order to evaporate away trichloroethylene and water from the vessel at a evaporating rate of 6 liters/hour. The sizes of the resultant polyethylene particles distributed as indicated in Table 2.

In each of the Comparison Examples 1 and 2, procedures identical to those in Example 1 were effected, except that water was charged into the vessel in an amount indicated in Table 2, which was outside the specified range of the method of the present invention. The result is illustrated in Table 2.

Table 2

| Example | Item | Amount of water (Kg) | Distribution of particle size (%) | | |
|---|---|---|---|---|---|
| | | | Larger than 42 mesh size (*)₁ | Between 42 and 150 mesh sizes (*)₂ | Smaller than 150 mesh size (*)₃ |
| Example | 1 | 0.83 | 16 | 57 | 27 |
| | 2 | 1.20 | 11 | 64 | 25 |
| | 3 | 1.80 | 10 | 66 | 24 |
| | 4 | 2.40 | 12 | 62 | 26 |
| Comparison Example | 1 | 0.30 | 28 | 43 | 29 |
| | 2 | 6.00 | 26 | 49 | 25 |

Note
(*)₁The particles were retained on the 42 mesh size screen.
(*)₂The particles passed through the 42 mesh size screen but were retained on the 150 mesh size screen.
(*)₃The particles passed through the 150 mesh size screen.

From Table 2, it is obvious that the powdered polyethylenes prepared by the present examples contain fine particles which passed through a 42 mesh size screen in percentages larger than those in the comparison examples.

EXAMPLES 5 through 9

In each of the Examples 5 through 9, operations identical to those in Example 1 were repeated, except that water and trichloroethylene were used in amounts as illustrated in Table 3 and the dissolving point of the amount of the polyethylene in the amount of the trichloroethylene was as indicated in Table 3. The results are illustrated in Table 3.

Table 3

| Item Example | Amount of trichloro-ethylene (Kg) | Amount of water (Kg) | Dissolving point (°C) | Distribution of particle size (%) | | |
|---|---|---|---|---|---|---|
| | | | | Larger than 42 mesh size | Between 42 and 150 mesh sizes | Smaller than 150 mesh size |
| 5 | 9 | 1.29 | 91 | 15 | 55 | 30 |
| 6 | 12 | 1.50 | 90 | 10 | 65 | 25 |
| 7 | 18 | 1.92 | 85 | 16 | 60 | 24 |
| 8 | 24 | 2.31 | 83 | 15 | 55 | 30 |
| 9 | 30 | 2.73 | 80 | 15 | 55 | 30 |

EXAMPLES 10 through 12

In each of the Examples 10 through 12, operations identical to those in Example 3 were carried out, except that the evaporation of trichloroethylene and water was carried out at a temperature as indicated in Table 4. The results are illustrated in Table 4.

Table 4

| Item Example | Evaporation temperature (°C) | Distribution in particle size (%) | | |
|---|---|---|---|---|
| | | Larger than 42 mesh size | Between 42 and 150 mesh sizes | Smaller than 150 mesh size |
| 10 | 25 | 14 | 25 | 61 |
| 11 | 45 | 15 | 63 | 22 |
| 12 | 50 | 20 | 61 | 19 |

In the range between 25° and 50°C, the lower the evaporation temperature the larger the percentage of polyethylene particles smaller than 150 mesh size.

COMPARISON EXAMPLE 3

In comparison Example 3 the same procedures as in Example 3 were repeated, except that trichloroethylene and water were evaporated away at a temperature of 70°C, which is higher than the upper limit of the evaporating temperature of the method of the present invention. The resultant powder consisted of 61% by weight of large particles which were retained on a 42 mesh size screen including an amount of lumps, 35% by weight of medium particles which passed through the 42 mesh size screen and were retained on a 150 mesh size screen and 4% by weight of fine particles which passed through the 150 mesh size screen.

EXAMPLES 13 through 15

In each of the Examples 13 through 15 the operations identical to those in Example 3 were carried out, except that the evaporation of trichloroethylene and water was effected under a reduced pressure at a evaporating rate per 1 kg of polyethylene as indicated in Table 5. The results are also illustrated in Table 5.

Table 5

| Item Example | Evaporating pressure (mmHg) | Evaporating rate (liter/hour /kg poly-ethylene) | Distribution in particle size (% by weight) | | |
|---|---|---|---|---|---|
| | | | Larger than 42 mesh size | Between 42 and 150 mesh sizes | Smaller than 150 mesh size |
| 13 | 200 – 700 | 0.5 | 7 | 71 | 22 |
| 14 | 200 – 700 | 1.5 | 18 | 60 | 22 |
| 15 | 200 – 700 | 2.0 | 24 | 54 | 22 |

COMPARISON EXAMPLE 4

In Comparison Example 4 operations identical to those in Example 3 were repeated, except that the evaporating rate of trichloroethylene and water was 3.33 liter/hour per 1 kg of the polyethylene. The resultant product consisted of 45% by weight of large particles retained on a 42 mesh size screen including an amount of lumps, 40% by weight of medium particles passed through the 42 mesh size screen and retained on a 150 mesh size screen and 15% by weight of fine particles passed through the 150 mesh size screen.

EXAMPLES 16 through 18 and comparison EXAMPLE 5

In each of the Examples 16 through 18, and the Comparison Example 5, the operations identical to those in Example 2 were carried out, except that the stirring paddles were rotated at a peripheral velocity as indicated in Table 6. The results are also illustrated in Table 6.

Table 6

| Item Example | Peripheral velocity (m/sec.) | Distribution in particle size (% by weight) | | |
|---|---|---|---|---|
| | | Larger than 42 mesh size | Between 42 and 150 mesh sizes | Smaller than 150 mesh size |
| Comparison Example 5 | 3 | 55 | 30 | 15 |
| Example 16 | 6 | 18 | 58 | 24 |
| 17 | 12 | 15 | 62 | 23 |
| 18 | 16 | 20 | 60 | 20 |

EXAMPLES 19 through 21

In each of the Examples 19 through 21, operations identical to those in Example 2 were repeated except that a type of organic solvent and water were used in amounts as indicated in Table 7. In each example, the amount of water used was 1.5 times that necessary for producing an azeotropic mixture with the amount of trichloroethylene used. The results are also indicated in Table 7.

EXAMPLE 28

In Example 28 a vertical type closed vessel was used which had a inside diameter of 30 cm, an inside depth of 44 cm and was provided with a top lid, stirrer consisting of a rotary shaft extending into the inside of the Table 7

| Item | Organic solvent | | Water | Dissolving point | Distribution in particle size (% by weight) | | |
|---|---|---|---|---|---|---|---|
| | Type | Amount (Kg) | (Kg) | (°C) | Larger than 42 mesh size | Between 42 and 150 mesh sizes | Smaller than 150 mesh size |
| Example | | | | | | | |
| 19 | Tetrachloroethylene | 12 | 3.6 | 93 | 13 | 65 | 22 |
| 20 | Tetrachloromethane | 18 | 1.2 | 86 | 8 | 66 | 26 |
| 21 | Toluene | 12 | 4.3 | 95 | 5 | 67 | 28 |

EXAMPLES 22 through 25

In each of the Examples 22 through 25, the same operations as in Example 2 were carried out, except that a type of polyethylene as shown in Table 8 was used, that trichloroethylene and water were used in amounts as indicated in Table 8 and that the dissolving point of the polyethylene under the given condition was as indicated in Table 8. The results are also presented in Table 8.

vessel through the top lid and a pair of stirring paddles 13 cm long extending from the shaft toward the inside wall of the vessel and a jacket. The vessel was charged with 5 Kg of the same type of polyethylene as used in Example 1, 10 Kg of trichloroethylene and 1 Kg of water. The dissolving point of the polyethylene under the above-mentioned conditions was 90°C. The stirring paddles were revolved at a peripheral velocity of 5 m/second while flowing hot water through the jacket. 45 minutes after the beginning of the stirring, the Table 8

| Item | Polyethylene | | Trichloroethylene | Water | Dissolving point | Distribution in particle size (% by weight) | | |
|---|---|---|---|---|---|---|---|---|
| | Melt flow index | Density (g/cm³) | (Kg) | (Kg) | (°C) | Larger than 42 mesh size | Between 42 and 150 mesh sizes | Smaller than 150 mesh size |
| Example | | | | | | | | |
| 22 | 0.2 | 0.923 | 20 | 1.8 | 84 | 13 | 63 | 24 |
| 23 | 2.0 | 0.922 | 18 | 1.7 | 85 | 14 | 61 | 25 |
| 24 | 25 | 0.922 | 12 | 1.2 | 90 | 20 | 60 | 20 |
| 25 | 60 | 0.919 | 12 | 1.2 | 90 | 16 | 62 | 22 |

EXAMPLES 26 and 27

In each of the Examples 26 and 27, the same procedures as those in Example 2 were effected, except that a type of copolymer was used which consisted of copolymerized vinyl acetate in an amount as indicated in Table 9 and the balance of copolymerized ethylene and which had a melt flow index as indicated in Table 9, that trichloroethylene and water were mixed in amounts as indicated in Table 9 and that under the given condition, the copolymer had a dissolving point as indicated in Table 9. The results are also presented in Table 9.

charge in the vessel had been raised to a temperature of 90°C and the polyethylene was completely dissolved in trichloroethylene. Thereafter, the charge was cooled to a temperature of 40°C by flowing cooling water through the jacket. At 40°C, trichloroethylene and water were evaporated away from the charge under a reduced pressure from 200 to 700 mmHg and at an evaporating rate of 5 liter/hour. The resultant product consisted of 13% by weight of large particles retained on a 42 mesh size screen, 53% by weight of medium particles passed through a 42 mesh size screen and retained on a 150 mesh size screen and 34% by weight of fine particles passed through a 150 mesh size screen.

Table 9

| Item | Copolymer | | Trichloroethylene | Water | Dissolving point | Distribution in particle size (% by weight) | | |
|---|---|---|---|---|---|---|---|---|
| | Content of vinyl acetate (% wt.) | Melt flow index | (Kg) | (Kg) | (°C) | Larger than 42 mesh size | Between 42 and 150 mesh sizes | Smaller than 150 mesh size |
| Ex. | | | | | | | | |
| 26 | 10 | 4 | 16 | 1.5 | 75 | 17 | 60 | 23 |
| 27 | 20 | 2.5 | 18 | 1.7 | 66 | 23 | 60 | 17 |

EXAMPLES 29 through 31 and comparison EXAMPLES 6 and 7

In each of the Examples 29, 30 and 31 and Comparison Examples 6 and 7, the same operations as in Example 28 were repeated using water in an amount as indicated in Table 10. The results are also presented in Table 10.

Table 10

| Item Example | Water | Distribution in particle size (% wt.) | | |
|---|---|---|---|---|
| | | Larger than 42 mesh size | Between 42 and 150 mesh sizes | Smaller than 150 mesh size |
| Example | 0.69 | 17 | 51 | 32 |
| | 30 | 1.50 | 13 | 56 | 31 |
| | 31 | 2.00 | 14 | 52 | 34 |
| Comparison | 6 | 0.25 | 37 | 38 | 25 |
| Example | 7 | 5.00 | 36 | 40 | 24 |

REFERENCE EXAMPLE 1

The fluidity of the finely powdered polyethylene particles prepared in Example 3, passing through a 42 mesh size screen and being retained on a 200 mesh size screen, was determined by the following methods. A cylinder of 20 cm inside diameter and 50 cm height, having a bottom, was vertically provided as a fluidizing vessel. A filter cloth of 20 cm diameter (grade: p-320, made by Tokyo Filter Cloth K.K.) was fixed at a location 10 cm from the bottom in parallel to the bottom. A portion of the cylinder beneath the filter cloth was connected to a conduit for blowing air therethrough into the cylinder. The polyethylene particles were charged on the filter cloth in a height of 3 cm. Air was blown into the fluidizing vessel through the air conduit under a pressure of 60 mmH$_2$O. The polyethylene particle layer on the filter cloth was fluidized and floated up by the blown air. During the air-blowing operation, the height of the fluidized polyethylene particle layer was measured. The floating ratio of the polyethylene particles was calculated as a ratio of the height of the fluidized particle layer to that of the original particle layer.

The same operations as mentioned above were repeated except that the polyethylene particles were charged in a height of 5 cm on the filter cloth and that air was blown under a pressure of 80 mmH$_2$O. The floating ratio was determined. The results are indicated in Table 11.

Table 11

| Height of particle layer (cm) | Air-blowing pressure (mm H$_2$O) | Floating ratio | Fluidity |
|---|---|---|---|
| 3 | 60 | 1.3 | good |
| 5 | 80 | 1.5 | good |

It was observed that throughout the air-blowing period of 5 minutes, the polyethylene particles were uniformly fluidized and floated off without channelling, which word refers to formation of an air path through which air flows without fluidizing the particles. From this fact, it could be understood that the polyethylene particles produced in accordance with the method of the present invention had an excellent fluidity.

COMPARATIVE REFERENCE EXAMPLE 1

The same polyethylene pellets as used in Example 1 were finely ground at a temperature of −40°C using a freezing grinder (Type: TAT-10LF-5, made by Tokyo Atomizer Producing Co., Ltd.). The resultant polyethylene powder was screened with 42 and 200 mesh sieves. The polyethylene particles of a size between 42 and 200 mesh size were subjected to the same fluidity tests as used in Reference Example 1. The results are presented in Table 12.

Table 12

| Height of particle layer (cm) | Air-blowing pressure (mm H$_2$O) | Fluidity |
|---|---|---|
| 3 | 60 | Channelling was created immediately after the start of air-blowing |
| 5 | 80 | Channelling was formed 2 minutes after the start of air-blowing |

From Table 12, it can be understood that the ground polyethylene particles had a low fluidity.

COMPARATIVE REFERENCE EXAMPLE 2

The same polyethylene pellets as those used in Example 1 were ground at an ambient temperature with a grinding machine (Type: T-800 made by Turbo Industry Co., Ltd.). By way of screening, polyethylene particles between 42 and 200 mesh size were collected, and subjected to the same fluidity tests as in Reference Example 1. The results are presented in Table 13.

Table 13

| Height of particle layer (cm) | Air-blowing pressure (mm H$_2$O) | Fluidity |
|---|---|---|
| 3 | 60 | Channelling occurred immediately after the start of air-blowing |
| 5 | 80 | Channelling occurred 1.7 minutes after the start of air-blowing |

What we claim is:
1. A method for preparing finely divided ethylene polymer particles, comprising:
   1. charging a closed vessel having a stirrer with 1 part by weight of an ethylene polymer selected from the group consisting of polyethylenes, copolymers of ethylene and vinyl acetate and mixtures of two or more of the above-mentioned polymers, 1.2 to 5.0 parts by weight of an organic solvent capable of dissolving said ethylene polymer and water in an amount of 1 to 4 times that necessary for producing an azeotropic mixture with said amount of said organic solvent charged;

2. stirring said charge to mix said ethylene polymer, organic solvent and water, and;

3. effecting, while stirring said mixture, the following operations:

a. heating said mixture to a temperature not lower than the dissolving point beneath which point said ethylene polymer can not be completely dissolved in said amount of said organic solvent, while allowing said ethylene polymer to be dissolved in said organic solvent;

b. cooling said mixture to a temperature of at least 25°C beneath said dissolving point of said ethylene polymer in said organic solvent but not lower than 0°C, and;

c. evaporating said organic solvent and water from said mixture under a reduced pressure condition, while said ethylene polymer is allowed to deposit in the form of finely divided smoothly surfaced spherical particles from the mixture of said organic solvent and water.

2. A method as claimed in claim 1, wherein said stirrer is provided with a rotary shaft and at least two stirring paddles extending from said shaft and approaching the inside wall surface, of said vessel, and rotated at a peripheral velocity of said stirring paddles of 4 to 16 m/second.

3. A method as claimed in claim 2, wherein said peripheral velocity of said stirring paddles is 5 to 14 m/second.

4. A method as claimed in claim 1, wherein said water in said mixture is in an amount of 1.5 to 3.5 times that necessary for producing the azeotropic mixture with said organic solvent.

5. A method as claimed in claim 1, wherein said heating is carried out to a temperature between 70° and 90°C.

6. A method as claimed in claim 1, wherein said polyethylene is selected from polyethylenes having a melt flow index of 0.1 to 60.

7. A method as claimed in claim 1, wherein said copolymer consists of at most 50% by weight of copolymerized vinyl acetate and the balance of copolymerized ethylene.

8. A method as claimed in claim 7, wherein the content of said copolymerized vinyl acetate moiety in said copolymer is at most 30%.

9. A method as claimed in claim 1, wherein said organic solvent is selected from the group consisting of aliphatic hydrocarbons, cycloaliphatic hydrocarbons, aromatic hydrocarbons and halogenated aliphatic hydrocarbons each having a boiling point of 50° to 150°C, and mixtures of two or more of the above-mentioned compounds.

10. A method as claimed in claim 9, wherein said aliphatic hydrocarbon is selected from the group consisting of n-hexane, n-heptane and n-octane.

11. A method as claimed in claim 9, wherein said cycloaliphatic hydrocarbon is either cyclohexane or cycloheptane.

12. A method as claimed in claim 9, wherein said aromatic hydrocarbon is selected from the group consisting of benzene, toluenes, xylenes and ethyl benzene.

13. A method as claimed in claim 9, wherein said halogenated aliphatic hydrocarbon is selected from the group consisting of tetrachloromethane, chloroform trichloroethylene and tetrachloroethylene.

14. A method as claimed in claim 1, wherein said organic solvent is in an amount of 1.5 to 2.5 parts by weight.

15. A method as claimed in claim 1, wherein said evaporating is carried out at an evaporating rate of 0.3 to 2.5 liters/hour of the mixture of said organic solvent and said water per 1 kg of said ethylene polymer.

16. A method as claimed in claim 15, wherein said evaporating rate is 0.5 to 2.0 liters/hour of said mixture per 1 kg of said ethylene polymer.

17. A method as claimed in claim 1, wherein said reduced pressure is in a range from 200 to 700 mmHg.

* * * * *